Dec. 27, 1955
J. L. STEIN ET AL
2,728,249
DRILL JIG
Filed Dec. 7, 1953
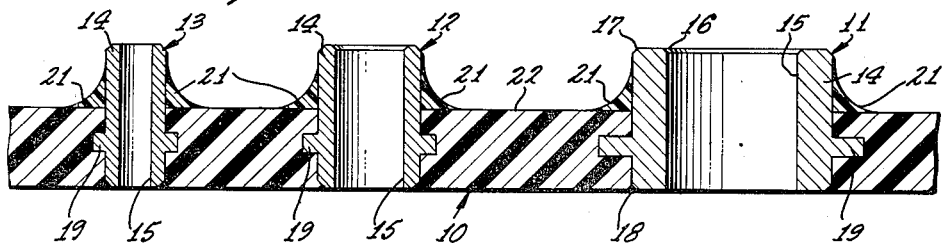
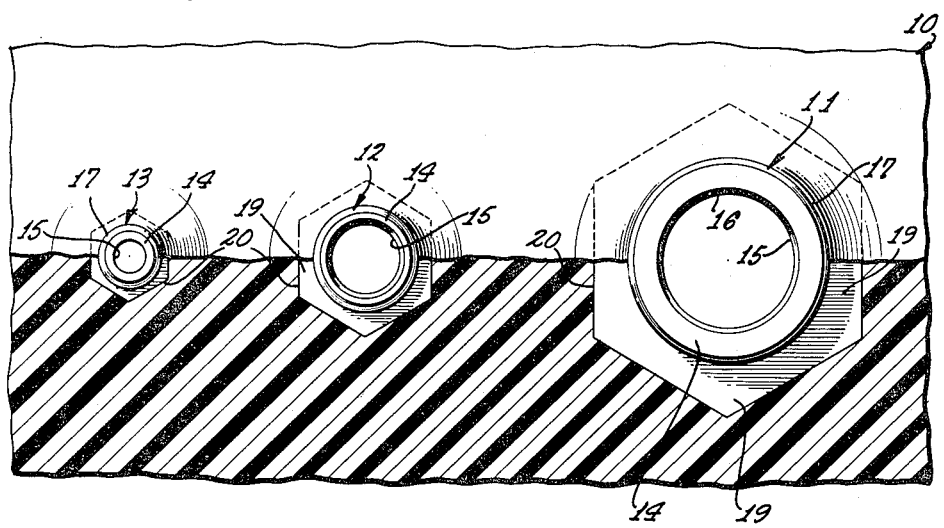
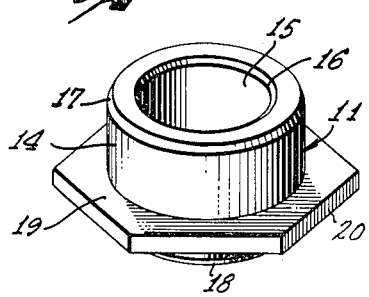
JACK L. STEIN &
PHILIP A. STEIN,
INVENTOR.
HUEBNER, BEEHLER,
WORREL & HERZIG,
ATTORNEYS.
BY

United States Patent Office 2,728,249
Patented Dec. 27, 1955

2,728,249

DRILL JIG

Jack L. Stein and Philip A. Stein, Los Angeles, Calif., assignors to American Drill Bushing Co., Los Angeles, Calif., a corporation of California Application December 7, 1953, Serial No. 396,712

2 Claims. (Cl. 77—62)

The invention relates to drilling operations and has particular reference to a drill jig and a drill bushing therefor which can be incorporated into the drill jig by molding. There has been a notable trend in recent years toward the increased employment of molded drill jigs. This trend is emphasized to a great extent by the very marked increase in the production of air frames utilizing relatively light-weight sheet material fabricated in multiple compound curves presenting such an irregular surface to which the drill jig need be put as to necessitate molding the jig rather than resorting to previous conventional methods. Further because of the fact that some parts are sheet metal and other light-weight construction require jigs of rather vast area, molded jigs lend themselves particularly well to such requirements and more especially make possible use of relatively light-weight materials in the jig and consequently are instrumental in holding tooling costs to a much lower figure than previously was possible.

When molded drill blocks are employed, the problem remains as to careful and precise location of drill bushings and the anchoring of those bushings in the drill block with sufficient firmness to assure accurate drilling under the rather exceptional conditions already related.

Although the drill block may advantageously be made of relatively light gage moldable stock, nevertheless the drill bushing must continue to have substantially greater thickness in order that the drill when it enters the bore of the bushing be properly aligned so as to enter the material to be drilled in a perpendicular direction with respect to the surface. For this reason the drill bushings must be substantially longer than the thickness of the drill block. Furthermore to properly fix the drill bushing in the light weight stock of the drill block, means must be resorted to for not only preventing the bushing from being pushed through the drill block but also for bracing the bushing in its properly aligned position.

It is therefore among the objects of the invention to provide a new and improved drill jig of relatively thin gage light-weight multiple construction wherein drill bushings are firmly and accurately anchored so that they maintain their alignment for long periods of time in use.

Another object of the invention is to provide a new and improved drill jig of molded character featuring drill bushings of exceptional bore length, thereby to improve the accuracy of drilling operations but which make possible a drill block of extremely light weight so that the drill jig can be applied to work sections of considerably great expanse.

Still another object of the invention is to provide a new and improved drill bushing which is particularly precise and which is so constructed that it can be effectively set in a molded drill block so as to take advantage to the fullest extent of the precision built into the drill bushing.

Also included among the objects of the invention is to provide a new and improved drill bushing which is relatively inexpensive to fabricate and which is of such design and construction as to permit easy and accurate incorporation of the drill bushing in a molded drill block.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a longitudinal sectional view of a typical drill jig showing by way of example a drill jig of relatively thin section in which drill bushings of different diameter are incorporated.

Figure 2 is a top view partially in section of the illustration of Figure 1.

Figure 3 is a vertical perspective view of one of the drill bushings.

In the embodiment of the invention chosen for the purpose of illustration there is shown a drill jig comprising a relatively thin multiple sheet 10 which may comprise any one of a number of plastic resins which on occasions are used without reinforcing material or which, should it be desired, may be reinforced by employment of conventional glass fiber fabric or other reinforcing technique. In practice the drill block may have a thickness or gage in the neighborhood of one-half inch over the largest proportion of the area to be served, the thickness, however, being variable at curves, corners and elsewhere, depending upon requirements.

A drill bushing 11 is illustrated in Figure 3 in one size. The drill bushings may, however, be employed in various commercial sizes as suggested additionally by drill bushing 12 and drill bushing 13 in Figure 1.

In instances where the thickness of the moldable sheet is of the category of one-fourth inch, the over-all length of the drill bushing is about one-half inch, the proportion, however, not being critical. The drill bushing in each case comprises a tubular portion 14 having a smooth cylindrical exterior and having an interior bore 15 extending therethrough which may be maintained to a tolerance of .0003±. It has been found good practice to provide a broken corner 16 at the inlet end of the bore to facilitate insertion of the drill bit into the bushing. Exterior broken corners 17 and 18 are also advantageous.

Upon the exterior of the tubular portion 14 there is provided a collar 19 which in the form shown for the purpose of illustration has a hexagonal perimeter 20. Collars of effective size are those among which the diameter of the hexagon of the collar is fifty percent greater than the diameter of the exterior of the tubular portion 14. A reasonably large expanse of surface in the collar is requisite to provide an ample bearing surface to resist pushing of the drill bushing through the sheet material should a drill strike the upper edge of the bushing instead of being inserted directly into the bore 15. The hexagonal perimeter of the collar presents a readily available means of constructing such collars in a manner which prevents rotation of the drill bushing within the drill block.

It is further significant that the thickness of the collar be substantially less than the thickness of the thin multiple sheet material so that there will be ample thickness of the material on both sides of the collar. In circumstances where the sheet material is one-quarter inch thick, a satisfactory thickness for the collar may be about one-sixteenth inch. This thickness will not vary appreciably for sizes of bushings varying in outside diameter from .208 inch to .760 inch. An over-all length of the bushing of one-half inch will satisfy all of these sizes. The dimensions suggested, however, are for the purpose of determining proportions and are not to be considered as requisite sizes.

In the setting of the bushings in the moldable sheet material the bushings may be located and positioned by a suitable pilot following conventional practices in the fabrication of molded drill jigs of the nature herein made reference to. After the drill bushings have thus been positioned, the moldable sheet material is placed around the bushings anchoring them in place, the moldable material flowing both under and over the collars of all of the bushings to be incorporated in the drill jig. After an initial set sufficient to firmly anchor the drill bushings in place, the pilots can be removed. Either prior or subsequent thereto fillets 21 of the same moldable sheet material are formed around the smooth exterior of that part of the tubular portion which extends above an upper face 22 of the sheet material 10. The fillet in each case provides a bracing for the drill bushing further assuring against its tilting out of accurate alignment. The anchoring of the collar is more particularly depended upon to prevent pushing through the sheet material and to prevent rotation of the bushing as a result of friction against the drill bit when it is driven rotatably through the bore.

The drill jig herein described is one especially well adapted to use where a high degree of precision is requisite and where at the same time lightness in weight of the drill jig is an important factor. The drill bushing constructed as described is one highly resistant to dislodgment and misalignment and is further one which readily lends itself to positioning on surfaces curved to a considerable degree.

While we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent devices.

Having described our invention, what we claim as new and desire to secure by Letters Patent is:

1. A drill jig comprising a sheet of initially moldable material in the form of a drill block of relatively rigid material in final form and having a work contacting face, and a drill bushing set in said block, said bushing comprising a tubular shank having an exit end substantially flush with said work contacting face of the block and an entrance end at the opposite side of the block, said shank having a substantially cylindrical exterior and a precision sized interior bore therethrough, a collar integrally united with and extending around the exterior of the shank intermediate the ends and more nearly adjacent the exit end than the entrance end, said collar having a non-circular perimeter, said collar being embedded between opposite faces of the block at a location spaced inwardly from said work contacting face and having a thickness not greater than one-half the thickness of the block, said block having a portion thereof extending throughout the length of the shank on the side of said collar adjacent the entrance end.

2. A drill jig comprising a sheet of initially moldable material in the form of a drill block of relatively thin gage and having a work contacting face, and a drill bushing set in said block, said bushing comprising a tubular shank having a substantially cylindrical exterior and a precision sized interior bore with an exit end substantially flush with said work contacting face of the block whereby to extend the exit end of the bore to the level of said work contacting face of the drill block, and an entrance end of the bore protruding outwardly from the opposite face of the block, a collar integrally united with and extending around the exterior of the shank adjacent to but spaced from the exit end and having a substantially hexagonal perimeter, said collar being embedded between opposite faces of the block and having a thickness not greater than one-half the thickness of the block, and block material extending to the top of said entrance end of the shank providing support for the shank throughout a greater distance between the collar and the entrance end than between the collar and the exit end.

References Cited in the file of this patent

UNITED STATES PATENTS

| | | |
|---|---|---|
| 2,039,105 | Naery | Apr. 28, 1936 |
| 2,392,804 | Basolo | Jan. 15, 1946 |
| 2,417,539 | Aronson | Mar. 18, 1947 |
| 2,483,686 | Wing | Oct. 4, 1949 |
| 2,541,306 | Taylor | Feb. 13, 1951 |

FOREIGN PATENTS

| | | |
|---|---|---|
| 698,643 | Great Britain | Oct. 21, 1953 |
| 702,918 | Germany | Feb. 20, 1941 |